(12) United States Patent
Wulff

(10) Patent No.: US 10,142,777 B1
(45) Date of Patent: Nov. 27, 2018

(54) SYSTEMS AND METHODS FOR LOCATING DEVICES IN VENUES

(71) Applicant: ZIH Corp., Lincolnshire, IL (US)

(72) Inventor: Thomas E. Wulff, Brookhaven, NY (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 15/976,466

(22) Filed: May 10, 2018

(51) Int. Cl.
| | |
|---|---|
| *H04W 4/02* | (2018.01) |
| *H04W 4/021* | (2018.01) |
| *G06K 9/00* | (2006.01) |
| *G01S 5/20* | (2006.01) |
| *H04W 4/33* | (2018.01) |
| *G01S 19/03* | (2010.01) |
| *H04N 7/18* | (2006.01) |

(52) U.S. Cl.
CPC ............... *H04W 4/021* (2013.01); *G01S 5/20* (2013.01); *G06K 9/00771* (2013.01); *H04W 4/33* (2018.02); *G01S 19/03* (2013.01); *H04N 7/18* (2013.01)

(58) Field of Classification Search
CPC .......... H04N 7/18; H04W 64/00; H04W 4/33; H04W 4/021; G01C 21/32; G01C 21/206; G01S 19/03; G01S 5/20; G06K 9/00771
USPC .......................................................... 340/8.1
See application file for complete search history.

(56) References Cited

U.S. PATENT DOCUMENTS

| | | | |
|---|---|---|---|
| 9,726,504 B2 * | 8/2017 | Rachuri | G01C 21/32 |
| 2015/0163764 A1 * | 6/2015 | Stern | H04N 7/18 348/143 |
| 2017/0318531 A1 * | 11/2017 | Calvarese | H04W 52/0212 |

* cited by examiner

*Primary Examiner* — Ali Neyzari
(74) *Attorney, Agent, or Firm* — Yuri Astvatsaturov

(57) ABSTRACT

In an embodiment, the present invention is a device locationing system operable to dynamically determine the presence of keep-out zones within a venue, and thereafter adjust positional data obtained through the device based on the presence of the previously detected keep-out zones.

14 Claims, 8 Drawing Sheets

SYSTEMS AND METHODS FOR LOCATING DEVICES IN VENUES

BACKGROUND OF THE INVENTION

Venues, such as retail spaces, warehouses, and other bounded areas, sometimes use locationing methods (e.g., ultrasonic locationing) to keep track of certain targets like mobile devices or people, and provide asset tracking/location data. However, due to the inaccuracy of ultrasonic (or other) locationing (also referred to as "microlocationing") techniques, paths supposedly traversed by tracked devices may be indicated to be in areas where traversal is not possible. As an example, a mobile device being tracked in a retail space may be indicated to have traveled across an area occupied by shelves or other physical structures. While in some instances (e.g., where the intrusion into an occupied space is rather minor), the correct path can be inferred based on the relative proximity of an isle to the tracked path, this may not be possible when the tracked path is indicated as being between two isles or when the tracked path is straying from one isle to another. Additionally, determining that the path of the device is traversing an occupied area, in it of itself, can be challenging for many reasons.

Accordingly, there exists a need for improved designs for systems and methods configured to provide locationing of electronic devices and/or other assets in a variety of venues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
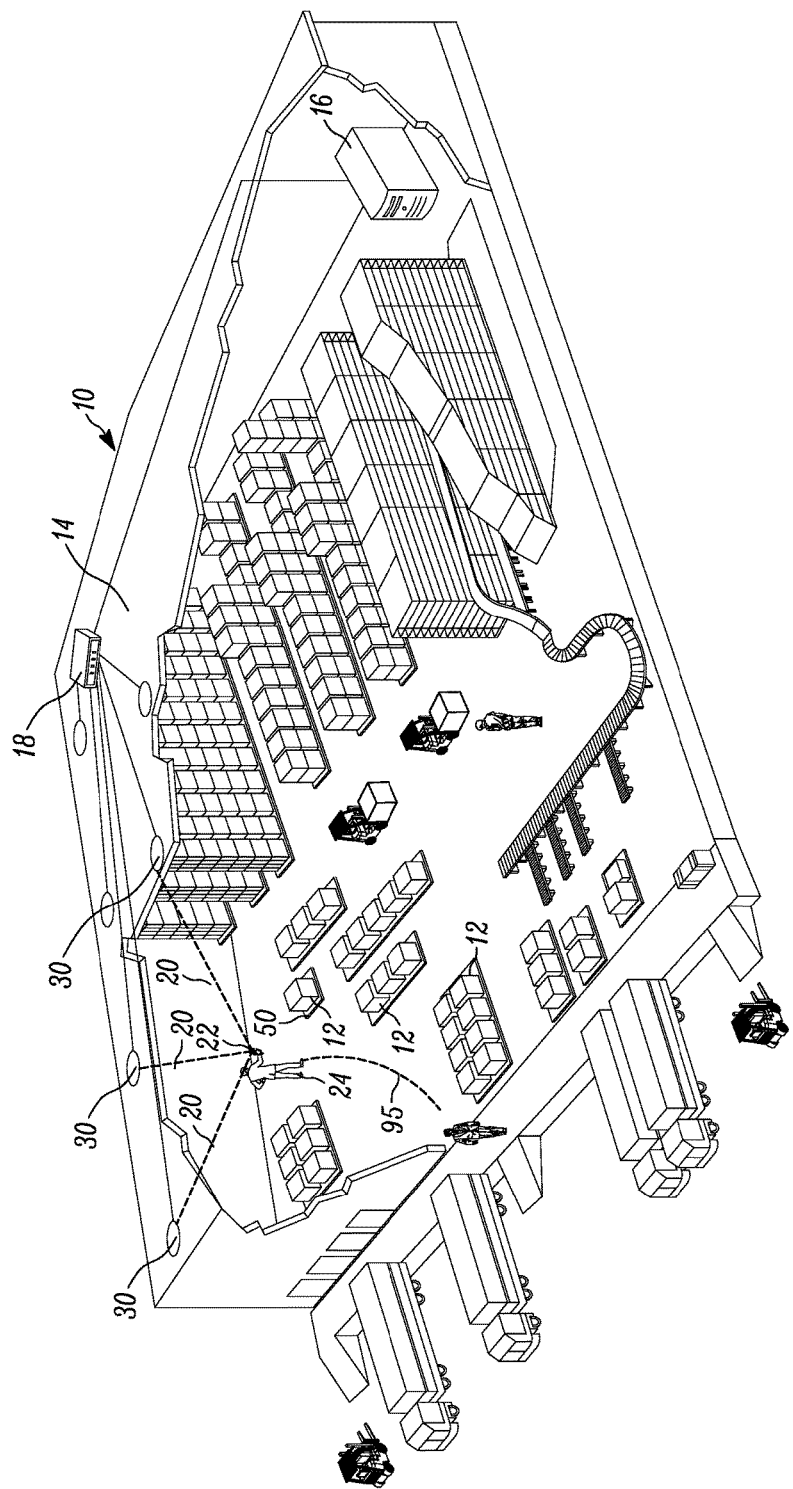
FIG. 1 illustrates an exemplary system disposed within an exemplary venue in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a locationing system for use within a venue. The locationing system includes a plurality of sensors disposed within the venue, each of the plurality of sensors configured to provide a data stream at least partially representative of a movement of at least one object on at least a portion of a floor of the venue; a server communicatively connected to the plurality of sensors, the server configured to generate a floor map of the venue based at least in part on the data stream from each of the plurality of sensors, the floor map including a plurality of keep-out zones; a plurality of ultrasonic transmitters disposed within the venue, each of the ultrasonic transmitters configured to emit an auditory signal; and a mobile device communicatively coupled to the server, the mobile device being configured to detect the auditory signal emitted by at least one of the ultrasonic transmitters, the mobile device being further configured to transmit signal data related to a detection of the auditory signal emitted by at least one of the ultrasonic transmitters to the server, wherein the server is further configured to provide positional data of the mobile device based at least in part on the signal data and based at least in part on the floor map.

Referring now to the drawings, FIG. 1 illustrates a perspective view, as seen from above, of a warehouse venue 10 illustrating an arrangement for mobile target tracking and locationing in accordance with an embodiment of the present disclosure. The mobile target may be animate, i.e., a person, such as an employee, a non-employee, a delivery person, a shopper, a customer, or, in general, any individual that is authorized or even unauthorized to be in the venue. The mobile target may also be inanimate, e.g., any mobile device, such as a handheld RFID tag reader, a handheld bar code symbol reader, a phone, a radio, a watch, a tablet, a computer, or, in general, any object or thing that may be carried and/or worn and/or operated by people movable within the venue. Other examples of inanimate mobile targets include product movers, such as trucks, forklifts, shopping carts, or the like, either operated by the aforementioned people or automatically. Still other examples of inanimate mobile targets include RFID tags associated with products to locate and track the products when moved either by the aforementioned people or by the aforementioned product movers. Yet another example of an inanimate mobile target includes an RFID tag associated with an identification badge worn by an authorized person to identify the person. Thus, the mobile target may be any combination of such animate and/or inanimate targets that travels in or through the venue. The venue may be any retail, factory, or warehouse environment, or the like, both indoors and outdoors.

The venue 10 may be any indoor or outdoor venue, and may have any layout or configuration. The venue 10 may have, for example, a plurality of shelving structures separated by an aisle, and some of the products can be mounted on one of the shelving structure, and others of the products can be mounted on the other shelving structure. Each product is preferably tagged with a mobile target, such as a radio frequency (RF) identification (RFID) product tag, preferably a passive RFID tag for cost reasons, and, in some applications, each RFID product tag may be associated with a pallet 50 (see FIG. 1), or a container, for supporting multiple products 12.

As also shown in FIG. 1, a multitude of sensing network units or stations 30 is deployed in the venue 10, and each station 30 is stationarily and fixedly mounted at known overhead positions, for example, on, or adjacent to, a ceiling 14. Advantageously, the sensing network units 30 can be installed every twenty to eighty feet or so apart in a grid pattern. Depending on the size of the venue, there can be, for example, thirty, sixty, or ninety or more stations 30 deployed in the venue. A network computer or host server 16, typically locally located in a backroom at the venue 10, comprises one or more computers and is in wired, wireless, direct, or networked communication with each station 30 through a network switch 18. The server 16 may also be remotely hosted in a cloud server. The server 16 may include a wireless RF transceiver that communicates with each station 30. For example, Wireless Fidelity (Wi-Fi) and Bluetooth® are open wireless standards for exchanging data between electronic devices. The server or controller 16 can control at least some aspects of each station 30.

Figure 2:
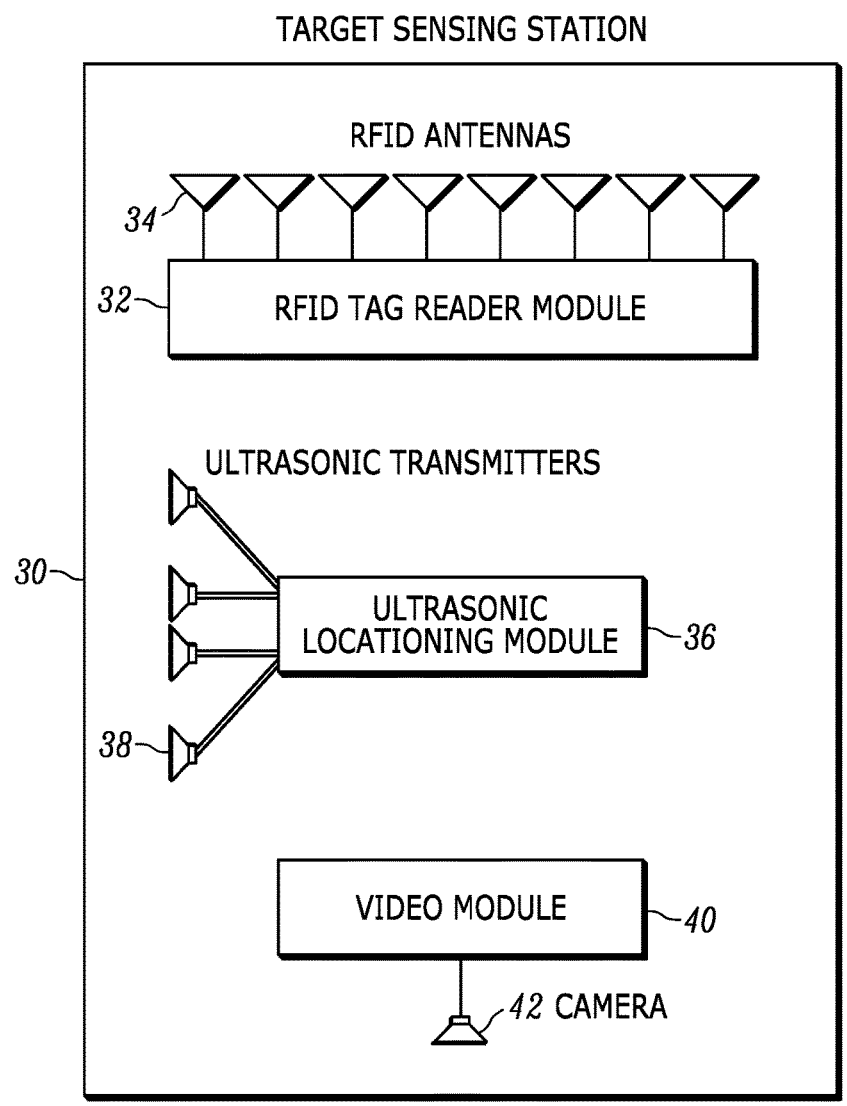
FIG. 2 illustrates a block diagram of a sensing network unit in accordance with an embodiment of the present disclosure.
Figure 3:
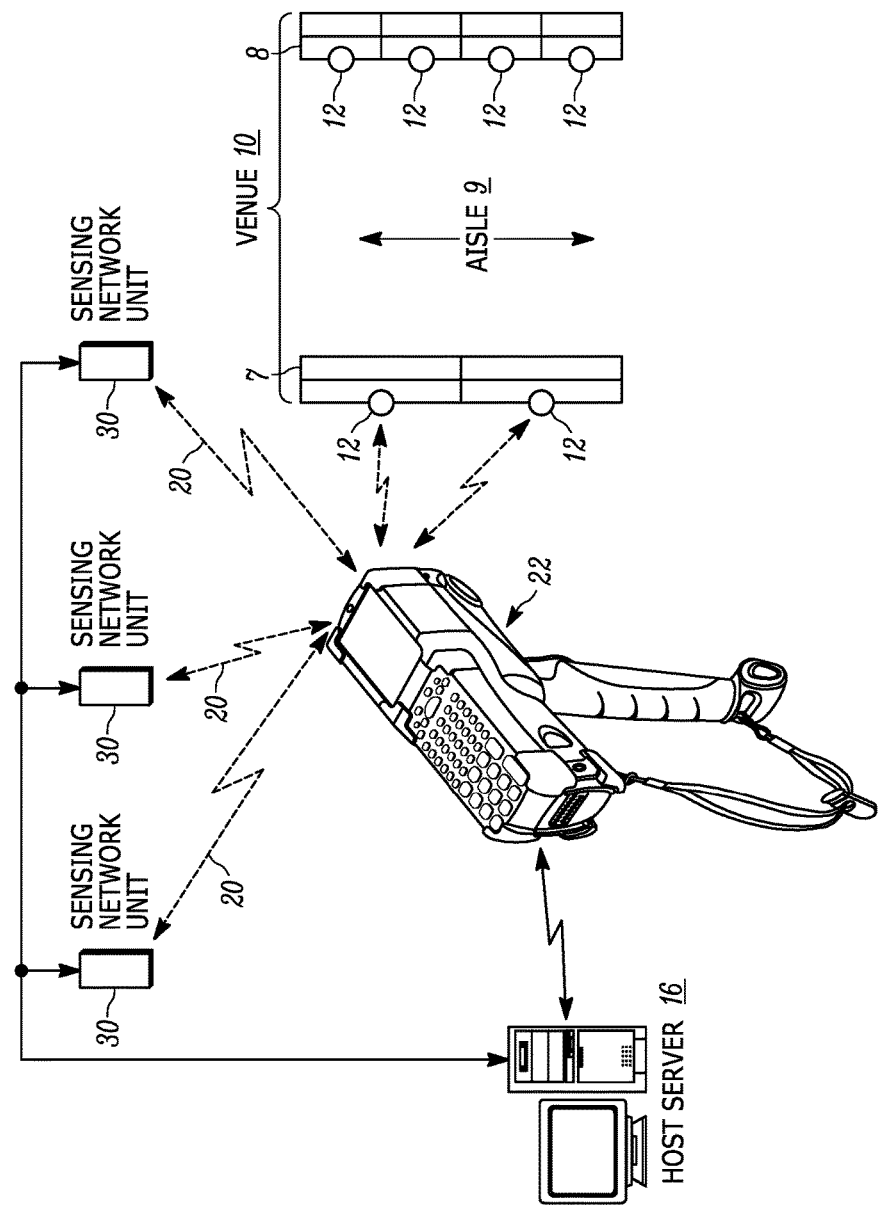
FIGS. 3 & 4 illustrates a block communication diagram of some system components in accordance with an embodiment of the present disclosure.

The block diagram of FIG. 2 depicts various target sensing systems that can be mounted in each overhead station 30. One of these sensing systems is a radio frequency (RF) identification (RFID) tag reader operative for reading a mobile target configured as an RFID tag as it moves along a plurality of or remains in coverage ranges or reading zones. More particularly, as shown in FIG. 2, each overhead RFID reader includes an RFID tag reader module 32 that has a controller, a memory, and an RF transceiver, which are operatively connected to a plurality of RFID antenna elements 34, which are energized by the RFID module 32 to radiate an RF beam over an antenna field pattern. The RF transceiver is operated, under the control of the tag reader module 32, to transmit RF beams to the tags, and to receive RF response signals from, the tags, thereby interrogating and processing the payloads of the tags that are in its reading zone. The payload or captured target data identifies the tags and their associated products 12. As shown in FIG. 3, the server 16 controls the overhead RFID readers in the plurality of sensing network units 30 to read the tags on the products 12 and/or any other item that may have RFID tags affixed to them.

Figure 4:
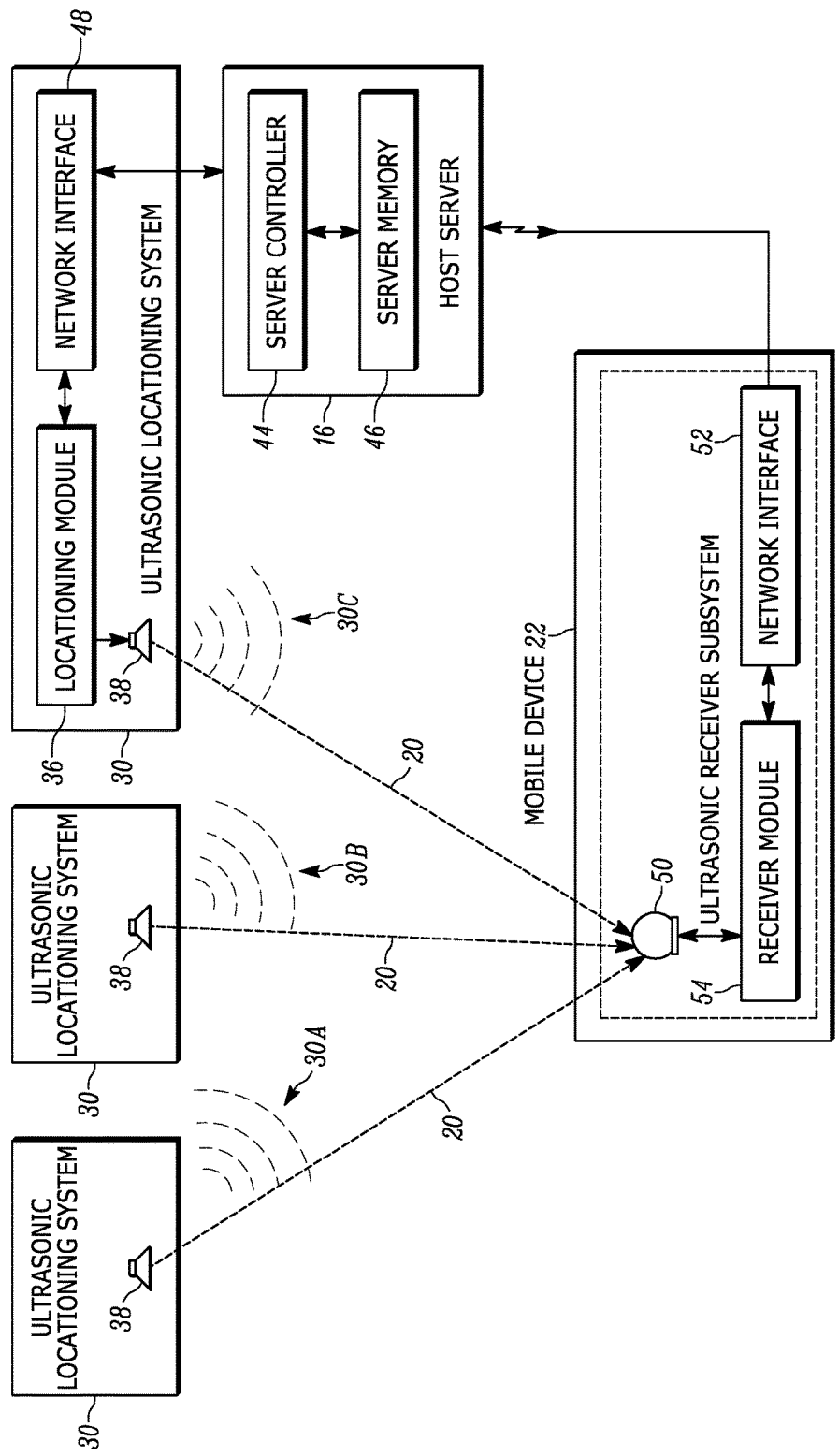

Another target sensing system that can be mounted in each overhead station 30 is, as shown in FIG. 2, an ultrasonic locationing system operative for locating mobile devices like, for example, a phone or, by way of non-limiting example, the mobile RFID reader 22, by transmitting an ultrasonic signal to an ultrasonic receiver, e.g., a microphone, on the mobile reader 22, phone, or other mobile devices. More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. As can be better seen in FIGS. 3 and 4, the host server 16 has a programmed microprocessor or server controller 44 that controls the ultrasonic locationing systems, and a server memory 46 for storing data and programs under the control of the server controller 44. The host server 16 is operatively connected through a network interface 48 to the respective locationing module 36 to generate a transmit drive signal to drive the respective speaker 38 in each sensing network unit 30 causing ultrasonic speaker 38 to periodically transmits ultrasonic ranging signals, preferably in short bursts or ultrasonic pulses, which are received by the microphone on the mobile reader 22. The host server 16 is also operatively connected through a network interface 52 to a receiver control and processing module 54 that is connected to the microphone 50. The microphone 50 and the receiver module 54 receive and convert each ultrasonic ranging signal 30A, 30B, 30C to an electrical signal that is further processed by the server controller 44 of the host server 16 to locate the mobile device 22. In an embodiment, the mobile reader determines when the ultrasonic ranging signals are received, and the flight time difference between the transmit time that each ranging signal is transmitted and the receive time that each ranging signal is received, together with the known speed of each ranging signal, as well as the known and fixed locations and positions of the speakers 38 on each sensing station 30, are all used to determine the position of the microphone and of the mobile reader 22, using a suitable locationing technique, such as triangulation, trilateration, multilateration, etc, as diagrammatically shown by dashed lines 20 in FIG. 1.

Another sensing system that could be used to detect/track a presence of a person/an object of interest is a video system operative for locating/detecting persons/objects of interest by capturing an image in a predefined field of view (FOV). More particularly, the video system can be mounted in each sensing network unit 30 and includes a video module 40 having camera control and processing electronics that is connected to a camera 42 for capturing at least one image capture (e.g., one or multiple snapshots, or a video stream). In some embodiments, the camera 42 is configured to capture an image over a FOV every x number of time units (e.g., second). In some embodiments, the camera 42 is configured to capture a continuous video stream. In some embodiments, the camera 42 is configured to capture periodic video streams every y number of time units (e.g., second) with each stream lasting every z number of time units (e.g., second). With reference to these examples, the captured images/video streams may be referred to as video capture data. The camera 42 can be a high-bandwidth, moving picture expert group (MPEG) compression camera. In some implementations, the camera may have a wide-enough FOV to capture images/video over an area that is covered by more than one RDIF read-zone. In some implementations, the camera may have a FOV corresponding to a particular read-zone of a specific RFID reader. The video capture data is transmitted from the camera 42 to the server 16 for processing where image/video analysis can be employed to detect the presence of a person.

Other non-illustrated sensing systems that could be used to locate a mobile target is a Wireless Fidelity (Wi-Fi) system operative for locating the mobile target by transmitting multiple Wi-Fi signals to a Wi-Fi receiver in the mobile target. More particularly, the Wi-Fi system is mounted in each sensing station 30 and includes a Wi-Fi network module having control and processing electronics operatively connected to a Wi-Fi antenna. Each Wi-Fi signal is transmitted to the Wi-Fi receiver in the mobile target. The receipt of multiple Wi-Fi signals from multiple Wi-Fi systems at the Wi-Fi receiver locates the mobile target. Still another non-illustrated sensing system that could be used to locate a mobile target is a Bluetooth Low Energy (BLE) system for locating the mobile target by transmitting multiple BLE signals to a BLE receiver in the mobile target. More particularly, the BLE system is mounted in each sensing station 30 and includes a BLE network module having control and processing electronics operatively connected to a BLE antenna. Each BLE signal is transmitted to the BLE receiver in the mobile target. The receipt of multiple BLE signals from multiple BLE systems at the BLE receiver locates the mobile target.

Referring back to FIG. 1, a person 24 holds, carries, and operates any of the aforementioned mobile devices such as, a mobile phone, or as illustrated by way of non-limiting example, a handheld, portable, mobile RFID tag reader 22 during his/her movement along a route 95 identified by dashed lines in FIG. 1 within the venue 10. The person 24 himself/herself and/or the tag reader 22, may each be considered, either individually or jointly, as a mobile target to be located and tracked in the venue. If has been recognized that when tracking mobile targets like user 24 and the carried mobile tag reader 22 by way of, for example, ultrasonic locationing, the detected path may appear to encroach on areas occupied by products 12, pallets 50, shelving structures, and other impassible objects. To address this issue, it has been recognized that for a given venue or a portion of a given venue, the RFID modules, the video modules 40, and potentially other sensors can be used to generate and/or update a floor plan/floor map that includes a combination of both pathways and keep-out zones or at least a floor map that provides keep-out zones. These floor maps can then be relied on when outputting positional data as provided by a locationing system.

Figure 5:
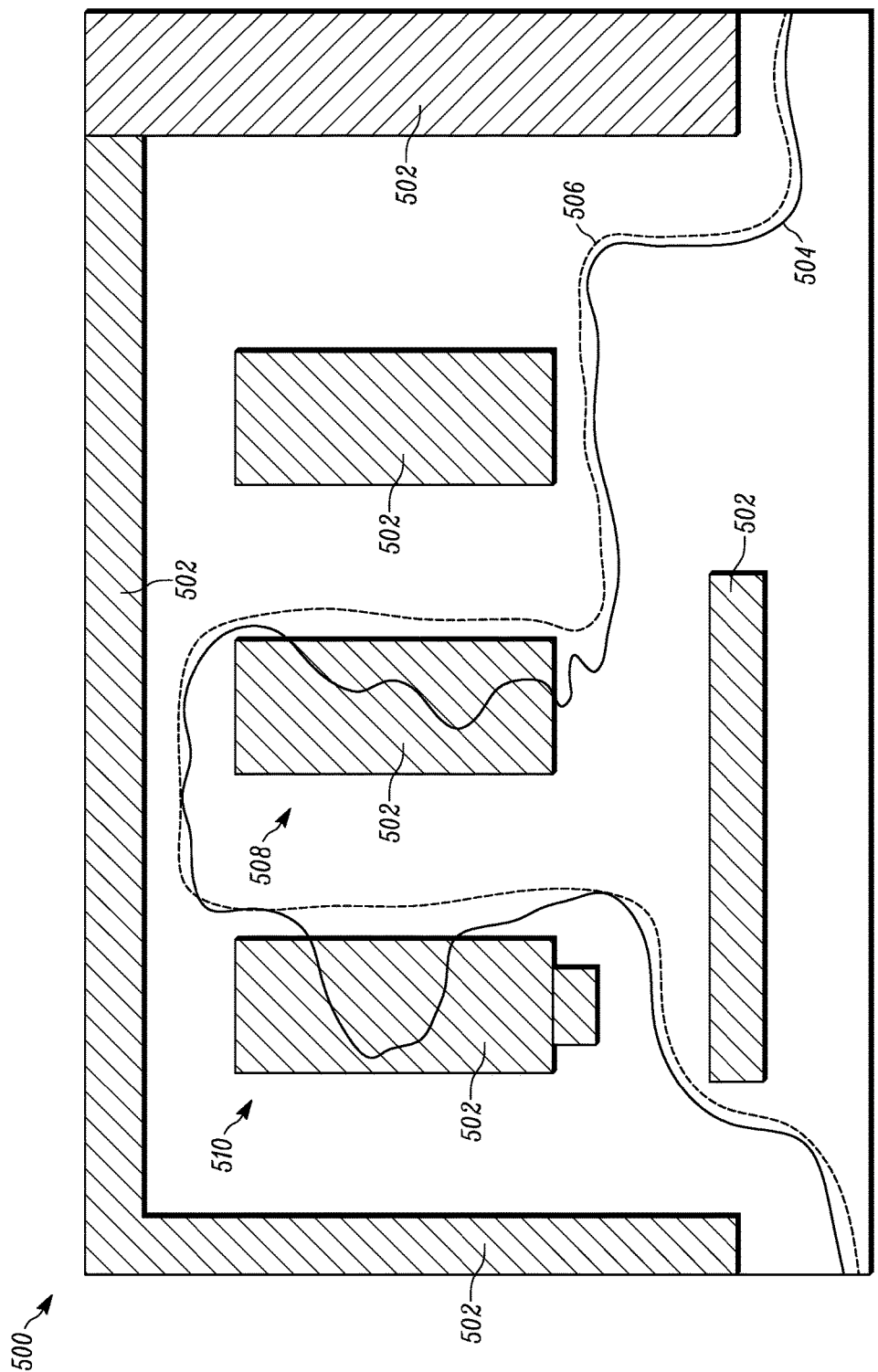
FIG. 5 illustrates an exemplary floor map of a venue depicting an actual path of a tracked device and a detected path of the tracked device.

Referring to FIG. 5, shown therein is an exemplary floor map 500 with a plurality of keep-out zones 502. It should be understood that a floor map can be provided in both a literal form and in a logical form. That is, an actual map can be generated having a plurality of keep-out zones designated thereon. Additionally, a floor map can be comprised of keep-out zone coordinates that can be correlated with the positional data used by the locationing system. Keep-out zones 502 may include shelves, display structures, stacked products, walls, point of sale stations, or any other kind of obstructions which prevent unobstructed passage therethrough. Additionally, shown in FIG. 5 are two paths; path 504 (indicated via a solid line) showing a path traversed by a mobile device where the positional data was obtained via ultrasonic microlocationing, and path 506 (indicated via a dashed line) showing the actual path traversed by the mobile device. Examining path 504, it is evident that the tracked mobile device is shown as having diverged from the device's actual path 506 and traversed over an area that is normally not accessible. This can be seen in regions 508 and 510 where path 504 deviates away from path 506, and enters and traverses some portions of keep out zones 502. Deviations like these can be caused by noise, signal reflection, signal obstructions, etc.

To address this inaccuracy in the positional data that forms the basis of path 504, location data obtained by the microlocationing system can be combined with the floor map 500 such that the device location data reported by the locationing system is adjusted based on the floor map 500 resulting in more accurate device positional data. In an embodiment, this can be done by disallowing positional data to position the tracked device in a keep-out zone. For example, when the system recognizes that path 504 enters a keep-out zone 502 in region 508, the tracking system can implement additional/alternate tracking approaches to provide positional data that is more in-line with the actual position of the device. These additional/alternate tracking approaches can include, for instance, locationing a device via secondary locationing means such as Wi-Fi locationing or employing video tracking based on associating the tracked mobile device with a target that is trackable via video monitoring. The additional/alternate tracking approaches can also include position estimation based on factors like previously known position data that is outside of a keep-out zone, nearest non-keep-out zone location, point of egress from the keep-out zone, etc. For example, in FIG. 5, the tracking system can be configured estimate positional data which makes up the path of the mobile device by taking the shortest non-keep-out zone path between the points where path 504 enters and exists keep-out zone 502 in the region 508. Implementing such position-correction techniques helps avoid inaccurate indications of position data.

Floor maps, such as the example floor map 500 shown in FIG. 5, can be generated in a variety of ways. In an example, these maps are generated based on foot-traffic patterns detected by the video modules 40. In particular, the tracking system can be configured to detect the movement of people through certain areas of a venue. This movement and the paths through which people move through may be considered an indication of open walkways/passable areas as it is unlikely that a person will traverse an area occupied by various structures like shelves or product displays. Conversely, the system may be configured to recognize area that exhibit no foot traffic as areas where people cannot pass through, associating them with keep-out zones.

Figure 6:
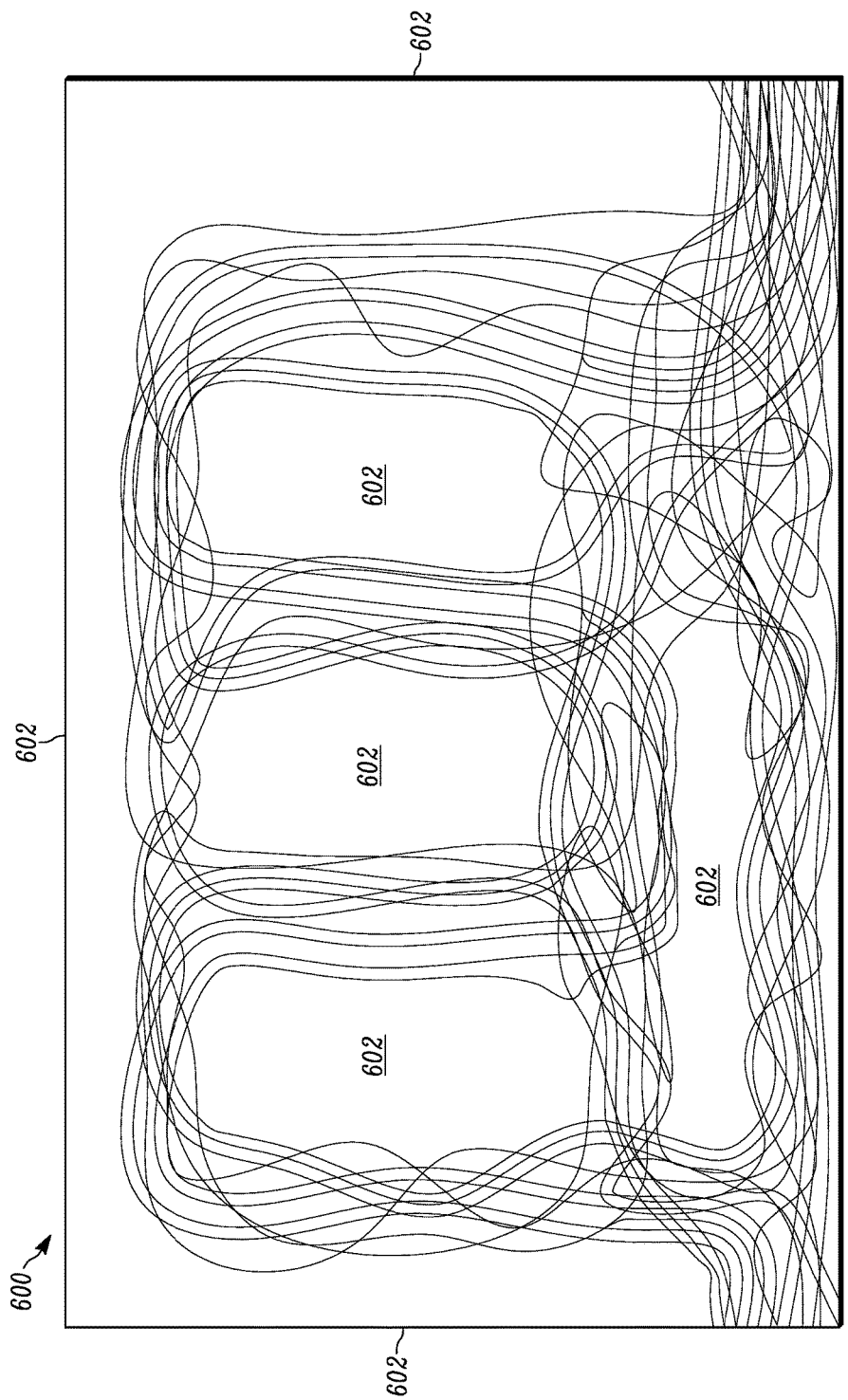
FIG. 6 illustrates an exemplary foot-traffic map of the venue of FIG. 5.

FIG. 6 illustrates an example of a pathway map 600 that may be used to generate the floor map 500 of FIG. 5. Shown in FIG. 6 are a plurality of paths (represented by the plurality of lines traversing various parts of the floor plan) which appear to avoid traversing areas 602. Having such traffic data, it can be reasoned that areas 602 cannot be accessed by people, and thus the tracking system can associate zones 602 with the keep-out zones 502 of the floor map of FIG. 5.

Figure 7:
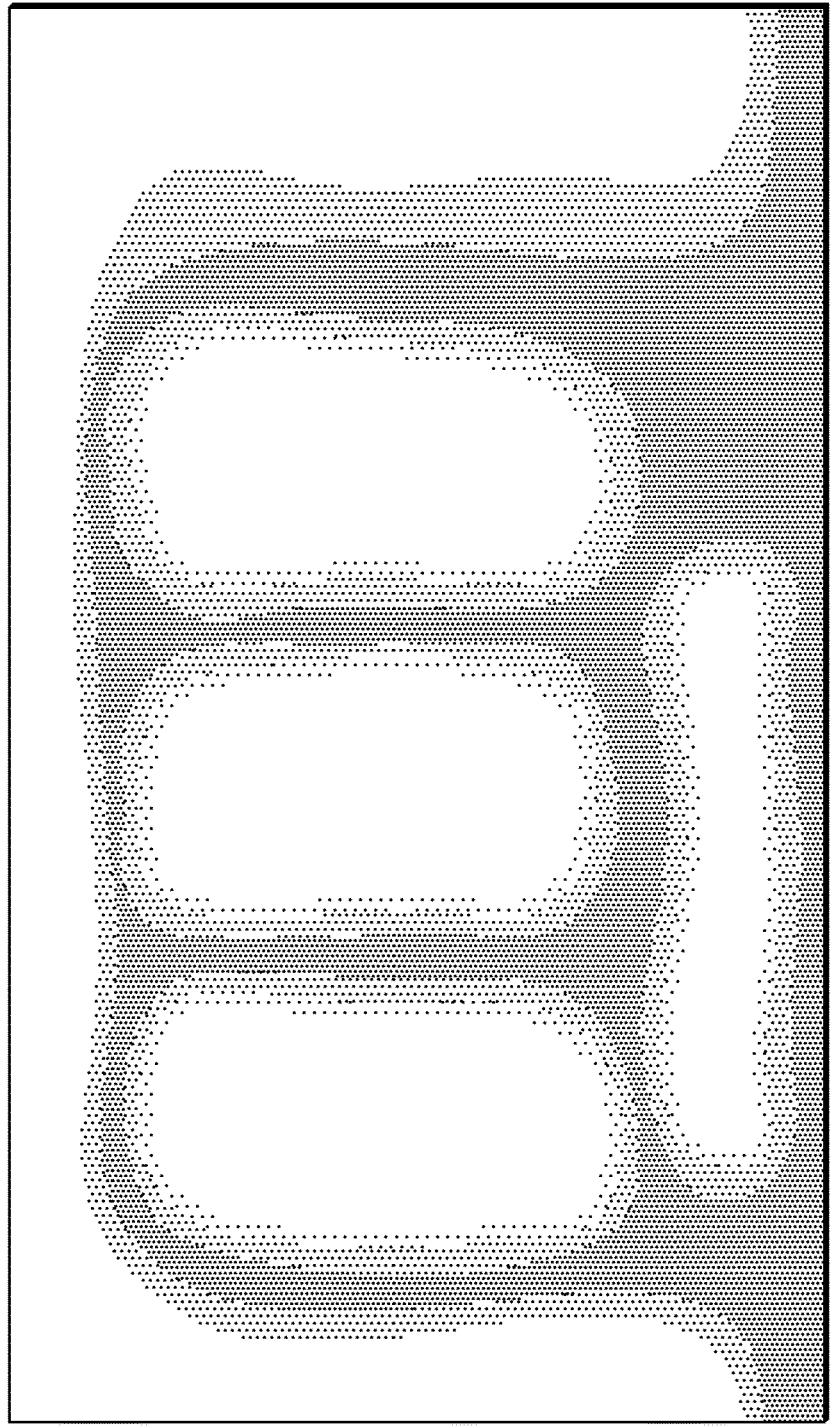
FIG. 7 illustrates an exemplary traffic heat-map of the venue of FIG. 5.

Another approach to generating the floor map with keep-out zones can rely on traffic heat maps. An example of such a heat map 700 is shown in FIG. 7 where darker areas of gray indicate increased traffic, lighter areas of gray indicate lower traffic, and areas with no gray indicate no traffic. Based on such a map, the tracking system may associate areas having less than a predetermined density of traffic with a keep-out zone.

The advantage of these approaches is that a floor map with keep-out zones may be compiled without first having a floor map of the venue. This is because keep-out zones are based on trackable features (e.g., foot traffic) and not necessarily on physical characteristics of venue. However, accuracy of the floor plan with keep-out zones may be improved if it is based on or otherwise combined with maps that include or coordinates of physical features that cannot be traversed by people or other objects being tracked.

Another advantage of the aforementioned approaches is that floor maps with keep-out zones can be maintained and updated dynamically. For example, in a retail venue, temporary product displays are often erected and dismantled by store personnel as a normal course of business. These temporary displays are not likely to be found in any specific floor plans that details the physical characteristics of the venue, making it difficult to base a keep-out zone on a positive association of the keep-out zone with the temporary display. This, however, is not an issue with the systems and methods described herein, as keep-out zones can be based on features that are separate from the actual displays (e.g., keep-out zones are based on a lack of foot traffic and not necessarily on a positive identification of a physically impassible feature). As a result, in, for example, a system that basis its keep-out zones on traffic movement, an assembly of a previously non-existent product display is dynamically reflected in the floor map whereby the lack of traffic through that display causes an associated of the trafficless area with a keep-out zone. Similarly, upon the dismantling of that display, renewed traffic through the previously designated keep-out zone can serve to remove the association of that zone with a keep-out area, making it once again available for passage, as viewed by the tracking system.

Figure 8:
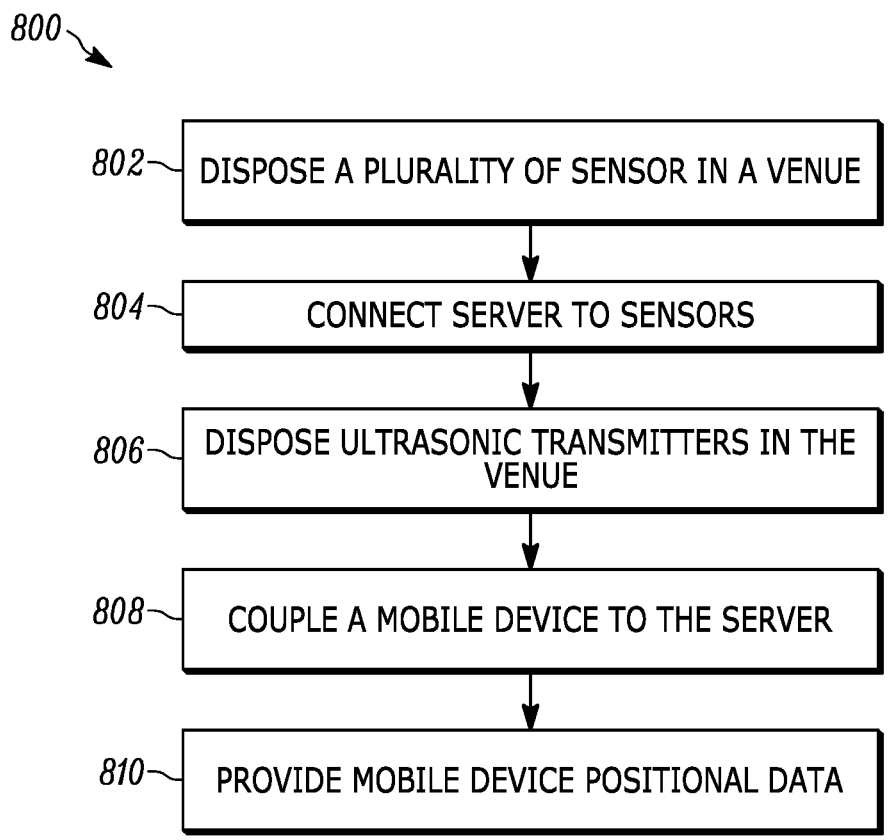
FIG. 8 illustrates a flowchart representative of a method of locating a mobile device within a venue.

Referring now to FIG. 8, shown therein is a flowchart representative of a method 800 of locating a mobile target within a venue. In step 802, the method includes disposing a plurality of sensors (e.g., video cameras) within the venue, each of the plurality of sensors configured to provide a data stream (e.g., video stream) at least partially representative of a movement of at least one object on at least a portion of a floor of the venue. In step 804, the method includes communicatively connecting a server to the plurality of sensors, the server configured to generate a floor map of the venue based at least in part on the data stream from each of the plurality of sensors, the floor map including a plurality of keep-out zones. In step 806, the method includes disposing a plurality of ultrasonic transmitters within the venue, each of the ultrasonic transmitters configured to emit an auditory signal. In step 808, the method includes communicatively coupling the mobile device to the server, the mobile device being configured to detect the auditory signal emitted by at least one of the ultrasonic transmitters, the mobile device being further configured to transmit signal data related to a detection of the auditory signal emitted by at least one of the ultrasonic transmitters to the server. Finally, in step 810, the method includes providing, via the server, positional data of the mobile device based at least in part on the signal data and based at least in part on the floor map.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A locationing system for use within a venue, the locationing system comprising:
 a plurality of sensors disposed within the venue, each of the plurality of sensors configured to provide a data stream at least partially representative of a movement of at least one object on at least a portion of a floor of the venue;
 a server communicatively connected to the plurality of sensors, the server configured to generate a floor map of the venue based at least in part on the data stream from each of the plurality of sensors, the floor map including a plurality of keep-out zones;
 a plurality of ultrasonic transmitters disposed within the venue, each of the ultrasonic transmitters configured to emit an auditory signal; and
 a mobile device communicatively coupled to the server, the mobile device being configured to detect the auditory signal emitted by at least one of the ultrasonic transmitters, the mobile device being further configured to transmit signal data related to a detection of the auditory signal emitted by at least one of the ultrasonic transmitters to the server,
 wherein the server is further configured to provide positional data of the mobile device based at least in part on the signal data and based at least in part on the floor map.

2. The locationing system of claim 1, wherein each of the plurality of sensors includes a video camera, and wherein the data stream includes a video stream capturing the movement of the at least one object along a respective path.

3. The locationing system of claim 2, wherein the plurality of keep-out zones is based at least in part on areas outside of the at least some of the respective paths.

4. The locationing system of claim 1, wherein the at least one object includes at least one of a person or a cart.

5. The locationing system of claim 1, wherein the server is further configured to update the floor map based at least in part on the data stream from each of the plurality of sensors.

6. The locationing system of claim 1, wherein the floor map is at least one of a logical floor map or a graphical floor map.

7. The locationing system of claim 1, wherein the server is further configured to generate the floor map of the venue based in part on a predefined floorplan.

8. A method of locating a mobile device within a venue, the method comprising:
 disposing a plurality of sensors within the venue, each of the plurality of sensors configured to provide a data stream at least partially representative of a movement of at least one object on at least a portion of a floor of the venue;
 communicatively connecting a server to the plurality of sensors, the server configured to generate a floor map of the venue based at least in part on the data stream from each of the plurality of sensors, the floor map including a plurality of keep-out zones;
 disposing a plurality of ultrasonic transmitters within the venue, each of the ultrasonic transmitters configured to emit an auditory signal;
 communicatively coupling the mobile device to the server, the mobile device being configured to detect the auditory signal emitted by at least one of the ultrasonic transmitters, the mobile device being further configured to transmit signal data related to a detection of the auditory signal emitted by at least one of the ultrasonic transmitters to the server; and
 providing, via the server, positional data of the mobile device based at least in part on the signal data and based at least in part on the floor map.

9. The method of claim 8, wherein each of the plurality of sensors includes a video camera, and wherein the data stream includes a video stream capturing the movement of the at least one object along a respective path.

10. The method of claim 9, wherein the plurality of keep-out zones is based at least in part on areas outside of the at least some of the respective paths.

11. The method of claim 8, wherein the at least one object includes at least one of a person or a cart.

12. The method of claim 8, wherein the server is further configured to update the floor map based at least in part on the data stream from each of the plurality of sensors.

13. The method of claim 8, wherein the floor map is at least one of a logical floor map or a graphical floor map.

14. The method of claim 8, wherein the server is further configured to generate the floor map of the venue based in part on a predefined floorplan.

* * * * *